United States Patent
Paulsen

(10) Patent No.: US 8,496,063 B2
(45) Date of Patent: Jul. 30, 2013

(54) SEPARATION OF DRILL CUTTINGS FROM DRILLING FLUID ON A SEABED

(75) Inventor: John Eirik Paulsen, Stavanger (NO)

(73) Assignee: Ott Subsea Bag Technology AS, Tananger (NO)

( * ) Notice: Subject to any disclaimer, the term of this patent is extended or adjusted under 35 U.S.C. 154(b) by 92 days.

(21) Appl. No.: 12/996,259

(22) PCT Filed: Jun. 3, 2009

(86) PCT No.: PCT/NO2009/000207
§ 371 (c)(1),
(2), (4) Date: Feb. 10, 2011

(87) PCT Pub. No.: WO2009/148327
PCT Pub. Date: Dec. 10, 2009

(65) Prior Publication Data
US 2011/0120721 A1  May 26, 2011

(30) Foreign Application Priority Data
Jun. 5, 2008  (NO) .................................. 20082638

(51) Int. Cl.
*E21B 21/06* (2006.01)
*E21B 7/12* (2006.01)

(52) U.S. Cl.
USPC ........... 166/357; 166/344; 166/352; 166/267; 175/5; 175/206; 175/207; 405/210

(58) Field of Classification Search
USPC .................. 166/357, 344–347, 351, 352, 265, 166/267; 175/5, 206, 207, 209, 217; 405/210
See application file for complete search history.

(56) References Cited

U.S. PATENT DOCUMENTS

| | | | | |
|---|---|---|---|---|
| 4,410,425 A * | 10/1983 | Gardes | ...................... | 210/167.31 |
| 4,457,842 A * | 7/1984 | Bereiter | ...................... | 210/198.1 |
| 5,004,051 A * | 4/1991 | Rosendahl et al. | ........... | 166/357 |
| 5,232,475 A * | 8/1993 | Jepson | .......................... | 95/260 |
| 6,062,313 A * | 5/2000 | Moore | .......................... | 166/357 |
| 6,216,799 B1 * | 4/2001 | Gonzalez | ......................... | 175/5 |
| 6,263,981 B1 * | 7/2001 | Gonzalez | ......................... | 175/5 |
| 6,276,455 B1 * | 8/2001 | Gonzalez | ....................... | 166/357 |
| 6,527,054 B1 * | 3/2003 | Fincher et al. | ................ | 166/357 |
| 6,666,286 B2 * | 12/2003 | Yamashita | ................... | 175/209 |
| 6,877,565 B2 * | 4/2005 | Edvardsen | .................... | 166/352 |
| 7,086,472 B1 * | 8/2006 | Incoronato | .................... | 166/357 |
| 7,185,705 B2 * | 3/2007 | Fontana | ....................... | 166/356 |
| 7,431,081 B2 * | 10/2008 | Stave | ............................ | 166/236 |
| 7,546,880 B2 * | 6/2009 | Zhang et al. | .................. | 166/358 |
| 7,644,768 B2 * | 1/2010 | Haughom | ..................... | 166/358 |
| 7,938,190 B2 * | 5/2011 | Talamo et al. | ................ | 166/358 |
| 7,958,948 B2 * | 6/2011 | Stave | ............................... | 175/7 |

* cited by examiner

*Primary Examiner* — Matthew Buck
(74) *Attorney, Agent, or Firm* — GableGotwals

(57) ABSTRACT

A method and device for recovering drilling fluid used in connection with the provision of a subsea well, in which the drilling fluid is circulated from a vessel on a sea surface via a drill string and out through a drill bit into an annulus which is defined by a borehole and the drill string. The device includes a filtering device which is connected, in respect of fluid, to an annulus and which is arranged to contain drill cuttings and drilling fluid. A fluid line extends from a portion of the filtering device to the vessel, the fluid line being arranged to carry drilling fluid which has been separated from the drill cuttings back to the vessel.

4 Claims, 3 Drawing Sheets

SEPARATION OF DRILL CUTTINGS FROM DRILLING FLUID ON A SEABED

CROSS-REFERENCE TO RELATED APPLICATIONS

This application is the United States National Phase of PCT Patent Application No. NO2009/000207 filed on 3 Jun. 2009, which was published in English on 10 Dec. 2009 under Publication No. WO 2009/148327 A1, which claims priority to Norwegian Patent Application No. 20082638 filed 5 Jun. 2008, both of which are incorporated herein by reference.

The present invention relates to a method and a device for separating drill cuttings from fluid on a seabed. More particularly, it relates to a method and a device for recovering drilling fluid which is used in connection with the provision of a subsea well, in which the drilling fluid is circulated from a vessel on the surface via a drill string and out through a drill bit into an annulus defined by the borehole and the drill string.

When wells are drilled for the extraction of petroleum deposits below the seabed, large amounts of drilled material or so-called drill cuttings are carried out of the borehole. A person skilled in the art will know that the drill cuttings are carried out of the borehole by means of the drilling fluid as described above.

In connection with the recovery of drilling fluids it has, until now, been almost universal to carry the drill cuttings with the drilling fluid up to a cleaning plant placed on the vessel or rig. Such a cleaning plant typically includes one or more sieving devices, known as vibratory separators or "shale shakers". By means of said cleaning plant, substantial proportions of the drill cuttings are separated from the drilling fluid. The drilling fluid separated from the drill cuttings is normally returned to a circulation system for drilling fluid and thereby used over again.

There are several drawbacks connected with placing a cleaning plant on board a vessel.

The drawbacks relate to, among other things, the fact that such a cleaning plant requires equipment including intermediate-storage containers for drill cuttings that have been separated from the drilling fluid. Such intermediate-storage containers, typically skips or so-called big bags, must be mobilized before the drilling commences, and they must be demobilized after the drilling is finished. In addition, the equipment must be organized on the vessel where space is normally very limited.

In addition, the intermediate-storage containers must, as a rule, be hoisted from the rig aboard a vessel and carried to shore for emptying. After that, the intermediate-storage containers must be returned to the vessel. Such mobilization and organization of equipment require a considerable number of crane lifts, which involves a safety risk for personnel in addition to the fact that equipment may get damaged. There is also a risk of pollution due to, for example, spilling and emission to the outside environment.

Additionally, treating drilling waste on a rig and ship means bad work-hygiene conditions, in the "shaker room" among other places, with gas/liquid mist and the risk of injuries in connection with skin contact, and also noise from shakers.

From the publication WO 99/46474 is known a system for the separation of particulate material from drilling fluid which is carried up from a subsea well. The system includes an expandable container which is placed on the seabed and which is connected between an annulus in the well and a drilling fluid return line arranged to carry drilling fluid back to a drilling rig on the sea surface. The container is shaped and dimensioned in such a way that a substantial proportion of the particulate material settles within the container while the drilling fluid with the particulate material is flowing through the container. Finally, the drilling fluid flows out of the container into the drilling fluid return line. The container could also be used as a storage container for a production well.

Even though the system proposed in said publication WO 99/46474 may reduce the need for cleaning devices on board a drilling rig, it is still encumbered with drawbacks. These drawbacks relate, first of all, to the fact that the separation of drill cuttings from drilling fluid is based on settling. This means that the container has to be of such a size that the flow rate will be so low that the particulate material will settle out of the fluid. The flow rate through the container is a function of the cross-sectional area of the container transversally to the direction of flow. The cross-sectional area will be reduced as the container fills with particulate material, which will mean that the flow rate through the container will increase as the container fills with particulate material. Thereby, either the container according to WO 99/46474 must be "overdimensioned" to meet the requirement for maximum flow rate or it must be accepted that an increasing proportion of particulate material is carried with the drilling fluid up to the rig as the container fills with particulate material.

The invention has for its object to remedy or reduce at least one of the drawbacks of the prior art.

The object is achieved through features which are specified in the description below and in the claims that follow.

In a first aspect of the present invention there is provided a method of recovering drilling fluid which is used in connection with the provision of a subsea well, in which the drilling fluid is circulated from a vessel on the surface via a drill string and out through a drill bit into an annulus defined by the borehole and the drill string, the method including the steps of:

carrying the flow of drilling fluid and drill cuttings from the annulus to a filtering device placed at the seabed, arranged to filter the drill cuttings from the drilling fluid;
carrying the drilling fluid filtered from the drill cuttings up to the vessel; and
storing the cuttings filtered from the drilling fluid in a portion of the filtering device.

By the term "filtering device" is meant that at least a portion of the drilling fluid must flow through a sheet which is provided with perforations. The sheet may be, for example, but is not limited to, a cloth-like material or a solid material which are both provided with perforations of a definite size. It will be understood that the filtering device may be provided with different portions having dissimilar degrees of perforations, both with respect to the spacing of the perforations and with respect to the size of each single perforation.

It is an advantage if the method further includes providing said annulus with a flow control device of such arrangement that the flow of drill cuttings and drilling fluid may selectively be directed either to the filtering device or further up through a riser to the vessel, the way it is done according to the prior art, or that a portion of the flow is directed into the filtering device and that the remaining portion is directed up through the riser.

The above-mentioned flow control device is desirable to avoid a stop in the drilling operation in cases in which there is a need to temporarily reduce or stop the flow of drilling fluid and drill cuttings into the filtering device.

The flow control device is typically a valve of a kind known per se.

Preferably, the flow control device is placed at the wellhead and downstream of a blowout preventer, called a BOP in the trade. In this connection, the term "downstream" is defined with respect to the flow of drill cuttings and drilling fluid out of the well.

It is an advantage if the method further includes adding, to the drill cuttings and drilling fluid, an agent arranged to facilitate the stabilization of fines. Stabilization may in some cases be desirable to prevent or reduce the trickling out of fines which are smaller than the perforations of the filtering device.

The agent may be a flocculant, for example. It is an advantage if the agent is environmentally safe. Further, it is an advantage if the agent is degradable. The agent may for example be added to the drilling fluid and drill cuttings while they are flowing between the borehole and the filtering device.

In some cases it may be advantageous if the method further includes carrying the drilling fluid filtered from the drill cuttings through at least one additional filtering device before the drilling fluid is carried up to the vessel.

The at least one additional filtering device is provided, in one embodiment, with a finer filter which is arranged to catch finer particles than the filtering device that first receives drill cuttings and drilling fluid from the well.

The additional filtering device may be integrated in the filtering device or it may form a separate unit which is connected in series with the filtering device by means of a flow channel or fluid line.

In one embodiment the method includes circulating the separated drilling fluid at least one more time through the filtering device before the drilling fluid is carried up to the vessel. Thus, the drilling fluid will go through at least a double filtration through the same filtering device. A person skilled in the art will understand that such double filtration requires the use of a return line.

In a second aspect of the present invention there is provided a device for recovering drilling fluid which is used in connection with the provision of a subsea well, in which the drilling fluid is circulated from a vessel on a sea surface via a drill string and out through a drill bit into an annulus defined by a borehole and the drill string, the device including: a filtering device which is connected, in respect of fluid, to said annulus, and which is arranged to contain drill cuttings and drilling fluid; and a fluid line extending from a portion of the filtering device to the vessel, the fluid line being arranged to carry drilling fluid, which has been separated from the drill cuttings, back to the vessel.

The fluid is circulated by means of a pumping device of a kind known per se.

It is an advantage if the filtering device is provided with one or more permeable portions arranged to retain solids material exceeding a predetermined size and with a collecting device for drilling fluid which has been separated from the drill cuttings by means of the at least one permeable portion.

In one embodiment, the filtering device is connected, in respect of fluid, to a circulation line arranged to carry at least partially filtered drilling fluid from a circulation line inlet portion to a circulation line outlet portion, the circulation line inlet portion being downstream of the circulation line outlet portion.

Preferably, the drilling fluid is carried through the circulation line by means of a pumping device known per se.

In one embodiment the circulation line inlet portion and the circulation line outlet portion are each connected to a respective one of two at least partially separate chambers in the filtering device.

The two at least partially separate chambers are provided with wall portions having dissimilar degrees of permeability. Thus, a two-step filtering of the drilling fluid may be achieved.

It will be understood that the filtering device could also be provided with more than two at least partially separate chambers which are provided with dissimilar degrees of permeability, the drilling fluid being circulated through the individual chambers by means of circulation lines connected to a pumping device.

Alternatively or additionally, each of said chambers may be provided with filter elements disposed substantially transversally to the direction of flow of the drilling fluid through the chamber.

Through such a two-step or multistep filtration a very high degree of purity may be achieved with respect to particulate material for the drilling fluid which is carried up to the vessel.

In what follows is described an example of a preferred embodiment which is visualized in the accompanying drawings, in which.

Figure 1:
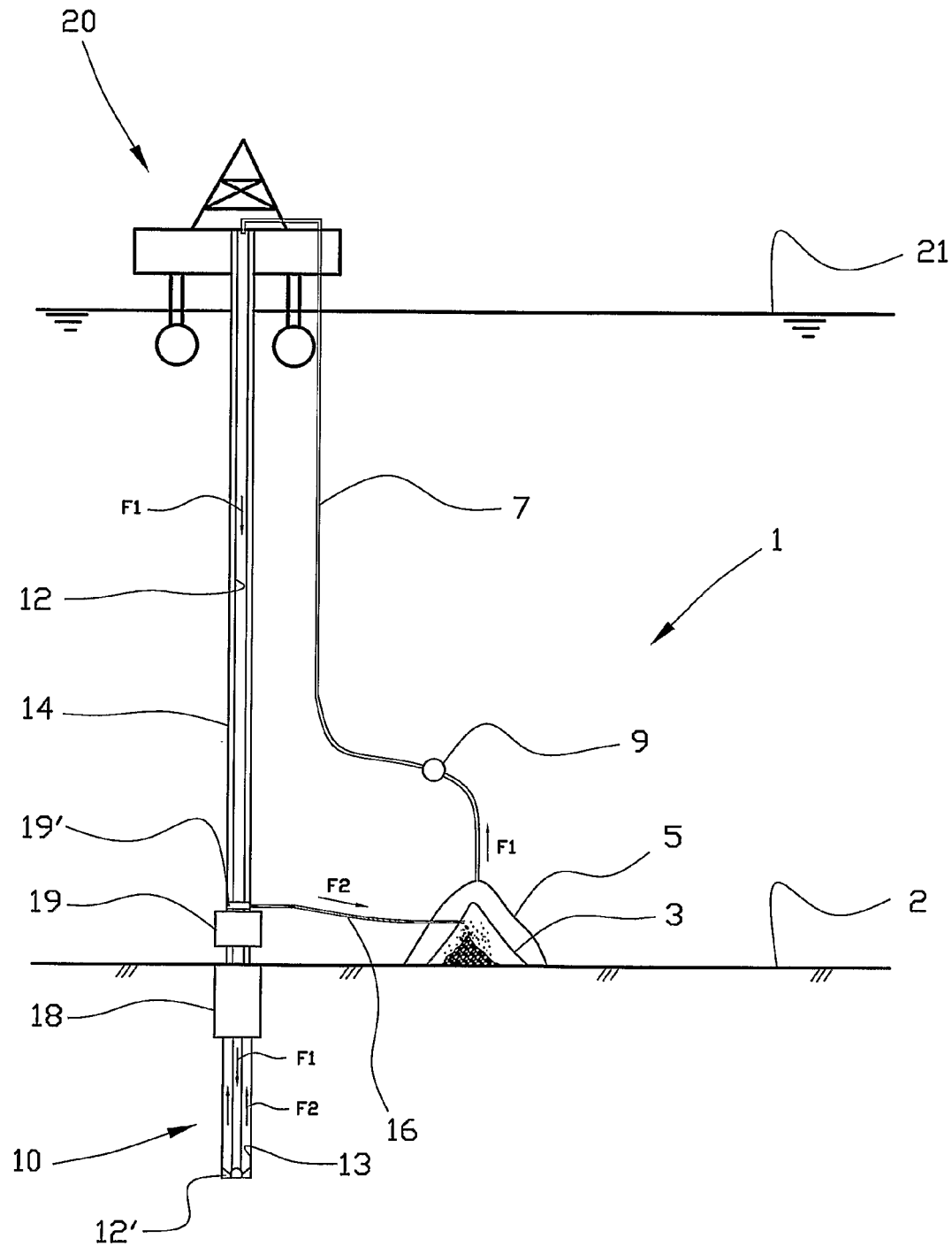
FIG. 1 shows a principle drawing of a filtering device according to a first embodiment of the present invention, in which the filtering device is placed on a seabed between a well and a drilling rig.

It will be understood that the figures are not to scale and that the mutual proportions of the individual components have not been represented in mutually correct proportions.

In the figures, the reference numeral 1 indicates a filtering device in accordance with the present invention, the filtering device 1 being connected, in respect of fluid, between a well 10 and a drilling rig 20 floating on a sea surface 21.

The filtering device 1 is placed on a seabed 2 at a well 10. The well 10 includes a wellhead 18 and a BOP stack 19.

Drill cuttings are circulated out of the well 10 in an annulus 13, defined by a drill string 12 and a riser 14, by means of drilling fluid which is pumped from the drilling rig 20 down the drill string 12 into the annulus 13 through a drill bit 12'.

The directions of flow of drilling fluid and a mixture of drilling fluid and drill cuttings are indicated by arrows marked F1 and F2, respectively.

A supply line 16 extends from the annulus 13 downstream of the BOP stack 19 to an inlet portion of the filtering device 1.

A valve device 19' is arranged to direct the flow F2 of drilling fluid and drill cuttings from the annulus 13 into the supply line 16. The valve device 19' is also arranged in such a way that it may alternatively direct at least some of the flow F2 of drill cuttings and drilling fluid further up through the annulus 13, as it is known according to the prior art (not shown). The possibility of carrying the flow F2 directly up to the drilling rig 20 outside the filtering device 1 is useful in connection with a possible need to temporarily stop the supply of drilling fluid and drill cuttings to the filtering device 1.

Figure 2:
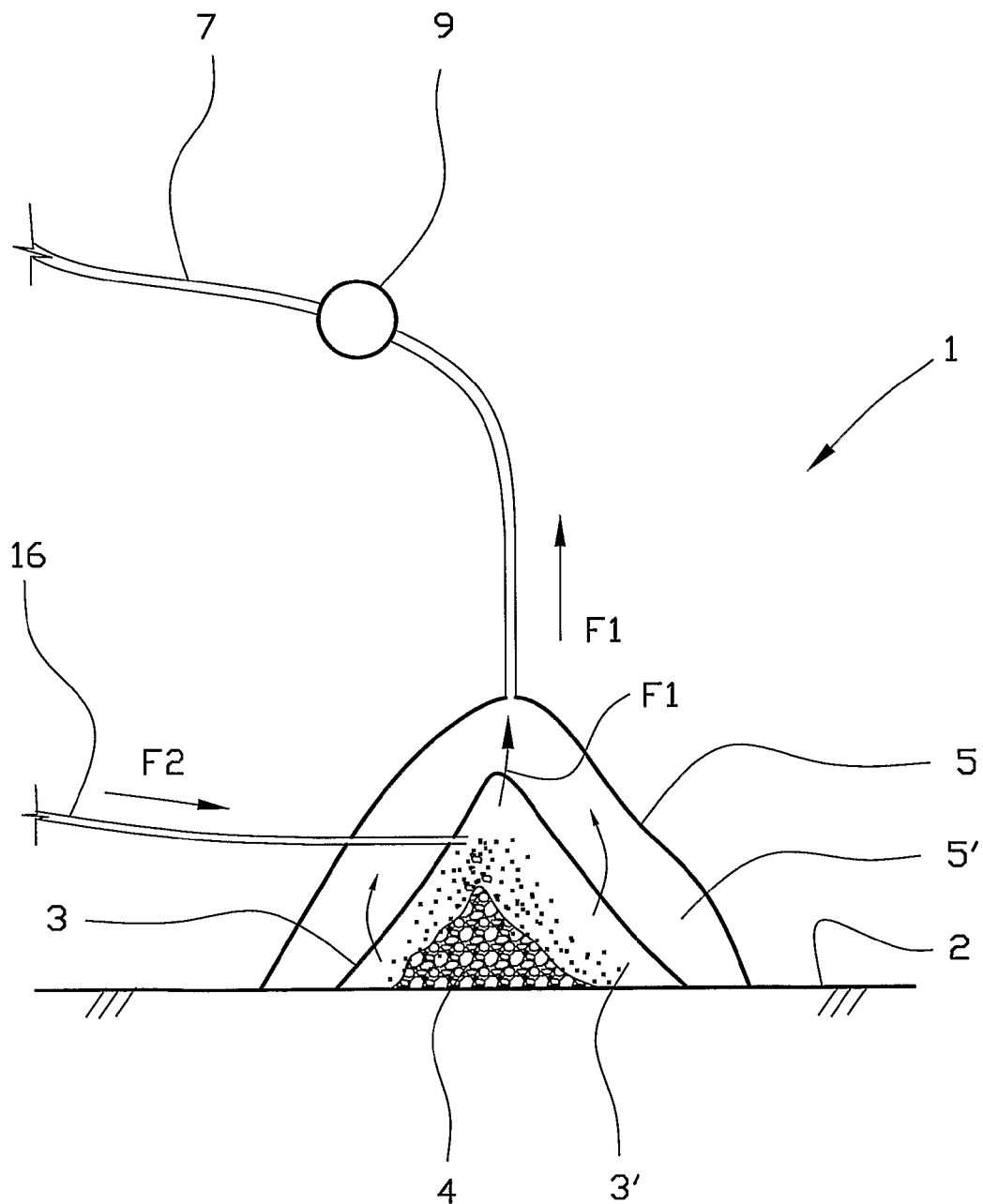
FIG. 2 shows, on a larger scale, the filtering device of FIG. 1.

The filtering device 1 which is shown in FIG. 1 and FIG. 2 includes a filter material 3 which is surrounded by an external jacket 5. The external jacket 5 is constituted by a substantially fluid-tight material.

The fluid supply line 16 extends through the external jacket 5 and further through an opening in the filter material 3. The flow F2 of drill cuttings and drilling fluid is thus carried into an inner chamber 3' in the filtering device 1.

The filter material 3 is constituted by a permeable material which is arranged to retain particulate material 4 exceeding a given size.

As drilling fluid and drill cuttings enter the inner chamber 3' of the filtering device 1, drilling fluid will evacuate out through the filter material 3 into an outer chamber 5' which is defined by the filter material 3 and said jacket 5, see the arrows F1 shown in FIG. 2.

A drilling fluid return line 7 is connected, in respect of fluid, to the outer chamber 5' of the filtering device 1 and extends up to a drilling fluid system (not shown) on the rig 20.

The drilling fluid is driven up to the rig 20 by means of a pumping device 9 of a kind known per se.

Figure 3:
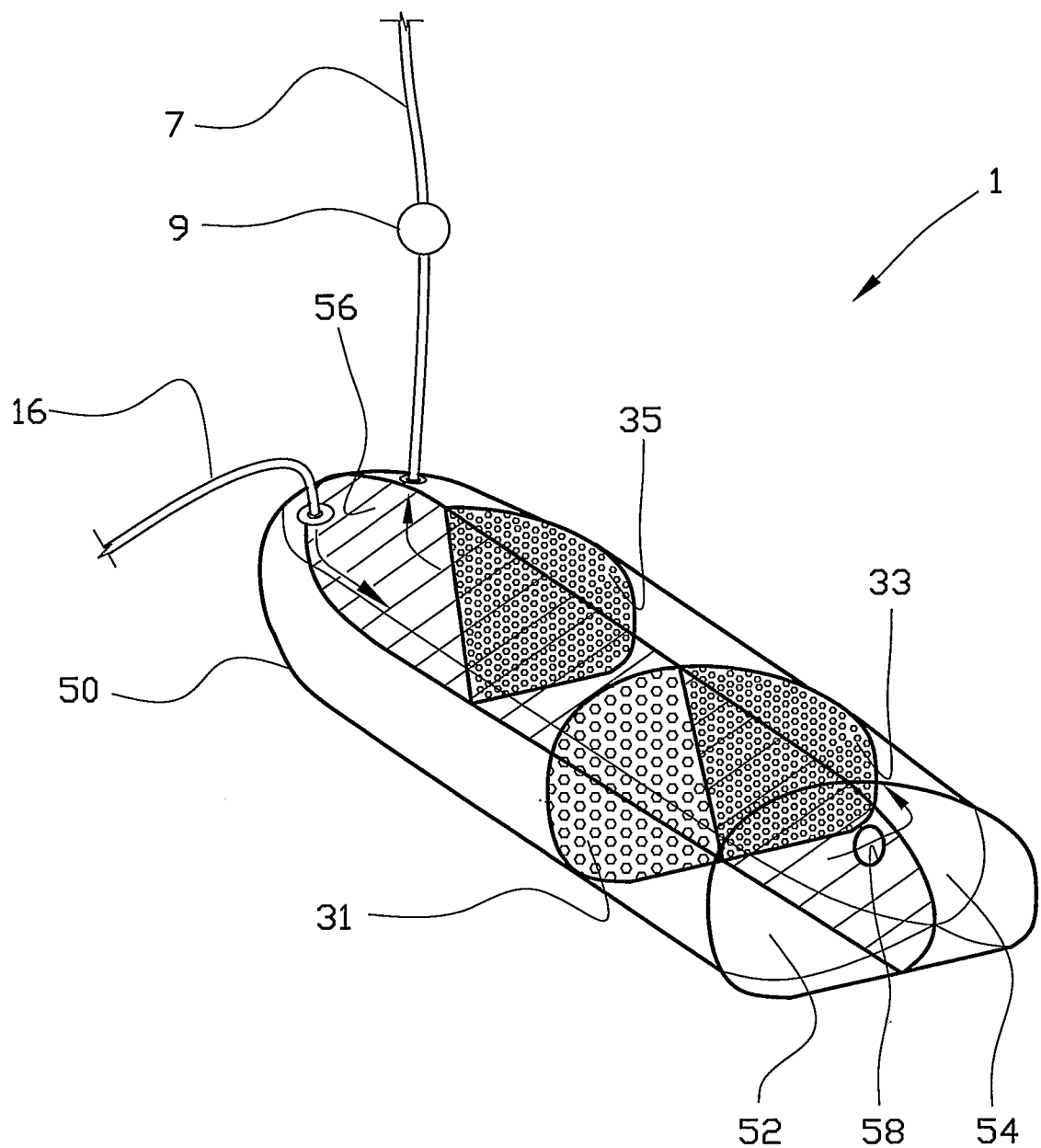
FIG. 3 shows a principle drawing of an alternative filtering device according to a second embodiment of the present invention.

In FIG. 3 is shown an alternative embodiment of the filtering device 1 itself. The way in which the filtering device 1 is connected to the annulus 13 by means of the supply line 16 and how drilling fluid is carried up to the drilling rig 20 correspond to what has been described above and, thus, will not be discussed any further.

The filtering device 1 of FIG. 3 is constituted by an elongated container 50 including a first chamber 52 and a second chamber 54. The container 50 is provided with an internal wall portion 56 which is shown in hatching in FIG. 3.

The outer surface of the container 50 and the internal wall portion 56 are substantially fluid-tight with the exception of a fluid opening 58 provided in a downstream end portion of the wall portion 56.

The first 52 and second 54 chambers are provided with, respectively one and two filter element(s) 31; 33, 35 arranged substantially perpendicularly to the direction of flow through the container 50. The direction of flow is indicated by arrows.

When a flow of drilling fluid and drill cuttings is carried through the supply line 16 and in through an inlet portion of the first chamber 52, drill cuttings will be separated from the drilling fluid partly because of settling and partly because of filtration through the filter elements 31, 33, 35. The opening 58 in the wall portion 56 could also be provided with a filter (not shown).

In the embodiment shown, the filter element 31 nearest to the inlet portion is the coarsest one, whereas the filter element 35 nearest to the outlet portion of the container 50 is the finest one.

By means of the filters 31, 33, 35, the maximum size of particles carried up to the rig 20 through the drilling fluid return line 7 may be determined in advance and, thus, is not affected by the ratio of fullness of the container or the flow rate through the filtering device 1.

In an alternative embodiment (not shown), at least portions of the container 50 of FIG. 3 are provided with a permeable outer surface. The container 50 is further provided with a fluid-tight outer jacket corresponding to the jacket 5 shown in FIG. 1 and FIG. 2. Fluid filtered through the permeable portions of the outer surface of the container 5, may be carried from the space defined by the outer surface of the container 50 and the jacket and up to the vessel 20 through the drilling fluid return line 7. Such a solution assumes that the drilling fluid return line 7 is also in fluid communication with said space.

The invention claimed is:

1. A device for recovering drilling fluid which is used in connection with the provision of a subsea well (10), in which the drilling fluid is circulated from a vessel (20) on a sea surface (21) via a drill string (12) and out through a drill bit (12') into an annulus (13) which is defined by a borehole and the drill string (12), said device comprises:
 a filtering device (1) comprising a first chamber (3', 52) and a second chamber (5', 54), the first chamber (3', 52) being separated from the second chamber (5', 54) at least partly by means of a filter (3; 31, 33, 35) arranged to retain and store drill cuttings (4) exceeding a predetermined size, the first chamber (3', 52) being connected to said annulus (13) by means of a fluid supply line (16); and
 a fluid line (7) extending from a portion of the second chamber (5', 54) to the vessel (20), the fluid line (7) being arranged to carry drilling fluid which has been separated from the drill cuttings (4) back to the vessel (20); and
 wherein the filtering device (1) is further connected, in respect of fluid, to a circulation line arranged to carry at least partially filtered drilling fluid from a circulation line inlet portion to a circulation line outlet portion, the circulation line inlet portion being downstream of the circulation line outlet portion.

2. The device in accordance with claim 1, wherein the annulus (13) is further connected to a flow control device (19) arranged for selectively directing the flow (F2) of drill cuttings and drilling fluid either to the filtering device (1) or further up through a riser (14) to the vessel (20).

3. The device in accordance with claim 1, wherein the circulation line inlet portion and the circulation line outlet portion are each connected to a respective one of two at least partially separate chambers in the filtering device (1).

4. The device in accordance with claim 3 wherein the two chambers are provided with wall portions which have dissimilar degrees of permeability.

* * * * *